Patented Nov. 23, 1937

2,100,081

UNITED STATES PATENT OFFICE 2,100,081

PROCESS FOR THE PRODUCTION OF PREPARATIONS CONTAINING THE ACTIVE CONSTITUENTS OF VEGETABLE PRODUCTS

Gerhard Madaus, Dresden, Germany, assignor to the firm Dr. Madaus & Co., Radebeul, Saxonia, Germany No Drawing. Application May 23, 1935, Serial No. 23,072. In Germany February 4, 1935

2 Claims. (Cl. 167—82)

My invention relates to a process for the production of preparations containing the active constituents of vegetable products.

The application Serial No. 3391, filed January 25, 1935 is a broad disclosure of a process for the production of vegetable products with the aid of sugar, which process consists in triturating the plants containing the active substances with non-crystallizable sugar or mixtures of sugar followed by drying in any well-known manner.

Now, I have discovered that honey can be employed with particular advantage for the extraction and fixation of the said active constituents. It is already known it is true, to employ honey as a basis for medicinal preparations, fennel honey having been produced by the mixing of fennel syrup, refined honey and fennel-oil sugar. Rose honey, a decoction of an alcoholic extract of rose petals with honey and glycerine is also known.

Another method of producing preparations of honey leads to the oxymels, which are obtained by mixtures of refined honey being concentrated with acetic vegetable extracts.

The process according to the present invention, however, has nothing in common with those methods, since the procedure, in the older methods, always consists in first producing a vegetable extract infusion or syrup of any kind, which is then, in turn, mixed with honey in a second working stage.

In contradistinction thereto, the present process consists in triturating the fresh plants or portions thereof, containing the valuable active substances, together with honey. In this case the honey acts in manifold ways, being first a medium for extracting the active volatile substances from the plants, and then a medium for the fixation of these substances in the preparation.

The preparations obtained by the present process can afterwards be worked up for the desired purposes in any convenient manner. Thus it is directly feasible to dry the extracts, or fill them into starch capsules for use.

Example I 5 kg. of Salvia officinalis are mechanically mixed with 5 kg. of refined honey and reduced together therewith in a disintegrator. The resulting product is divided into doses, and packed in starch capsules, which, if desired, may be wrapped in tin-foil and, if necessary also may contain preservatives.

Example II 2.5 kg. of fresh peppermint plants are disintegrated together with 2.5 kg. of bee honey, in the manner set forth in Example 1, 30 g. of formic acid being added, whereupon the mixture is dried in a current of dry air at room temperature and divided into doses.

I claim:—

1. The process of producing preparations containing the active constituents of vegetable substances, which comprises triturating the fresh plants in the presence of honey, thereby preserving the volatile constituents of the fresh plants in the finished product.

2. The process of producing preparations containing the active constituents of vegetable substances, which comprises triturating the fresh plants in the presence of honey thereby dispersing the honey in the plant substances, and then drying the resulting mixture in a current of dry air at substantially room temperature thereby preserving the active volatile plant constituents in the finished product.

GERHARD MADAUS.